United States Patent [19]

Haytayan

[11] 4,106,618
[45] Aug. 15, 1978

[54] NAIL ASSEMBLIES

[76] Inventor: Harry M. Haytayan, Sunnyside La., Lincoln, Mass. 01773

[21] Appl. No.: 640,587

[22] Filed: Dec. 15, 1975

[51] Int. Cl.$^2$ .................. B65D 83/02; B65D 85/24; B65D 85/62
[52] U.S. Cl. .................................. 206/343; 206/347; 206/820
[58] Field of Search ............... 206/343, 347, 338, 820, 206/521, 306; 229/93; 24/73 PF

[56] References Cited

U.S. PATENT DOCUMENTS

| | | | |
|---|---|---|---|
| 2,247,499 | 7/1941 | Hutchison, Jr. .................. 206/343 |
| 3,211,284 | 10/1965 | Anstett .................. 206/347 |
| 3,428,169 | 2/1969 | Hilti .................. 206/343 |
| 3,444,991 | 5/1969 | Raybois .................. 229/93 |
| 3,624,867 | 12/1971 | Reynolds .................. 24/73 PF |
| 3,812,961 | 5/1974 | Merrick et al. .................. 206/338 |
| 3,944,067 | 3/1976 | Bakoledis .................. 206/347 |

*Primary Examiner*—William T. Dixson, Jr.
*Attorney, Agent, or Firm*—Schiller & Pandiscio

[57] ABSTRACT

A nail clip is provided for use with pneumatically or hydraulically powered nail drivers. Each clip comprises a plastic strip consisting of a plurality of serially connected sleeves and a nail carried by each sleeve with a fracture line between each pair of sleeves.

29 Claims, 13 Drawing Figures

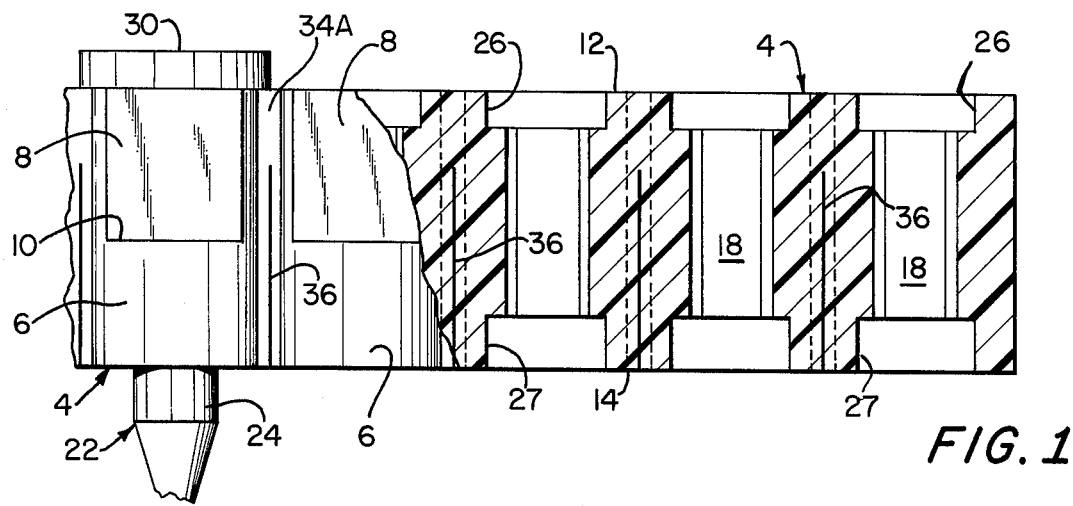
FIG. 1
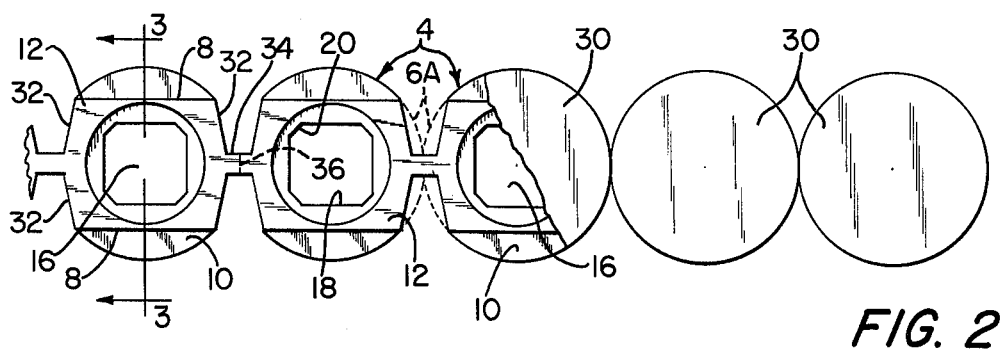
FIG. 2
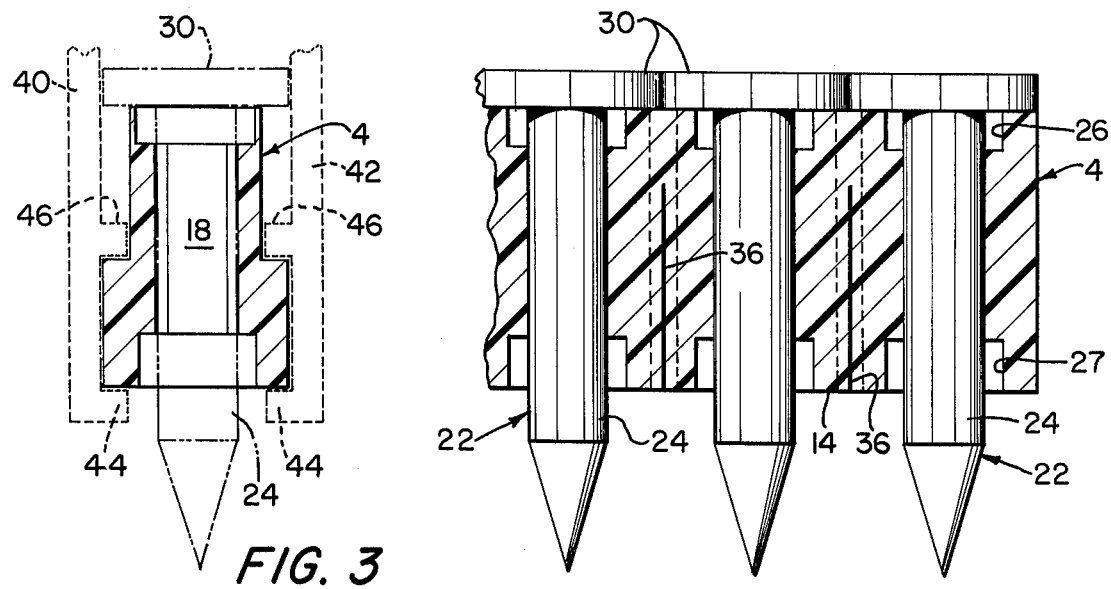
FIG. 3
FIG. 4

NAIL ASSEMBLIES

This invention relates to the use of power driven impact tools for driving fasteners into selected substrates and more particularly to provision of fasteners in strip form for use with such tools.

A number of manual and pneumatically or hydraulically operated impact tools have been designed for driving nails and other forms of impact-installed fasteners into materials such as metal, concrete, wood, and other materials, with the fasteners being fed from a spring loaded magazine. As exemplified in U.S. Pat. Nos. 3711008, 3638532 and 3278103, such tools generally consist of a guide track in the form of a bore along which a hammer or driver is reciprocated, and a side opening whereby fasteners may be introduced one by one into the hammer bore in position to be intercepted and driven by the hammer when the latter undergoes its drive stroke. While it is possible to load the magazine with fasteners on a one by one basis, it is appreciated that loading would be faciliated if the fasteners could be pre-assembled as a clip which could be inserted quickly and easily in the manner that clips of cartridges are installed in an automatic rifle. Accordingly, a number of attempts have been made to assemble a plurality of nails in the form of a strip in which nails are interconnected for easy handling and installation in the impact tool, with the result that on successive operations of the impact tool, the strip is advanced to insert a new nail into the guide bore and the hammer shears that nail from the strip and drives it into the workpiece. Examples of fasteners in strip form designed for use with impact tools are provided by U.S. Pat. Nos. 3211284, 3086207, 3841474, 3779373, 3382751, and 3904032 and German patent specification No. 1957930.

It is acknowledged that prior to this invention attempts were made to provide nail strips or clips comprising a plastic or metal strip in the form of a row of interconnected circular disks or cylindrical sleeves, and a nail extending through and held by each disk or sleeve. Such nail strips were arranged so that each disk or sleeve could be sheared off from the remainder of the strip when the nail associated therewith was driven by the hammer of the impact tool. However, arranging the disks or sleeves so that they could be sheared off as intended has presented problems. One such problem stems from the fact that it is essential to insure the perpendicularity of the fasteners as they are being fed from the magazine into the guide track of the impacting tool and as they commence moving along the guide track under the influence of the hammer. Certain nail strip designs have not been able to insure proper alignment of the nail as it moves into and along the guide track and as a consequence the nails tend to tilt and either jam the tool or are not driven accurately or fully with the force for which the tool is designed. The jamming problem has been particularly acute in the case of nail strip where the nails are mounted in plastic sleeves that surround only a portion of the nail shanks and are interconnected and spaced from one another by their web sections.

Accordingly, the primary object of this invention is to provide new forms of nail clips, comprising a series of nails provide new forms of nail clips, comprising a series of nails mounted to and retained by a supporting strip, which are designed for use in power driven impact tools and which are constructed so as to substantially eliminate any tendency of the nails to jam in the tool. A further object is to provide a nail clip of the character described which is designed to be slidably supported in a magazine so that it will not shift its position as a reuslt of tool recoil.

Still another object is to provide a nail clip of the character described wherein the supporting strip consists of a plurality of nail-holding sleeves or collars which are designed to be squashed and/or captivated between the workpiece and the nail head when the nail is fired into the workpiece; an alternative object is to provide a supporting strip consisting of a number of nail-holding sleeves which are designed to be separated from the nails when the nails are fired into a workpiece.

These objects are achieved by providing a nail clip comprising a supporting strip in the form of a series of sleeves or collars, a nail in each sleeve, and unoque web between each pair of sleeves with the webs designed to facilitate the shearing off of said sleeves singly and in sequence in response to a shearing force produced when a nail is impacted by the hammer of an impact tool. Other objects, advantages and features of the invention are deisclosed or rendered obvious by the following detailed description which is to be considered together with the accompanying drawing wherein:

FIG. 1 is a side elevation partly in section of a preferrec form of nail supporting strip provided in accordance with this invention;

FIG. 2 is a plan view of the strip of FIG. 1 with nails added to certain of its sleeves;

FIG. 3 is a cross-sectional view taken along line 3—3 of FIG. 2;

FIG. 4 is a longitudinal section view in elevation of a nail clip embodying the nail supporting strip of FIG. 1;

Figure 6:
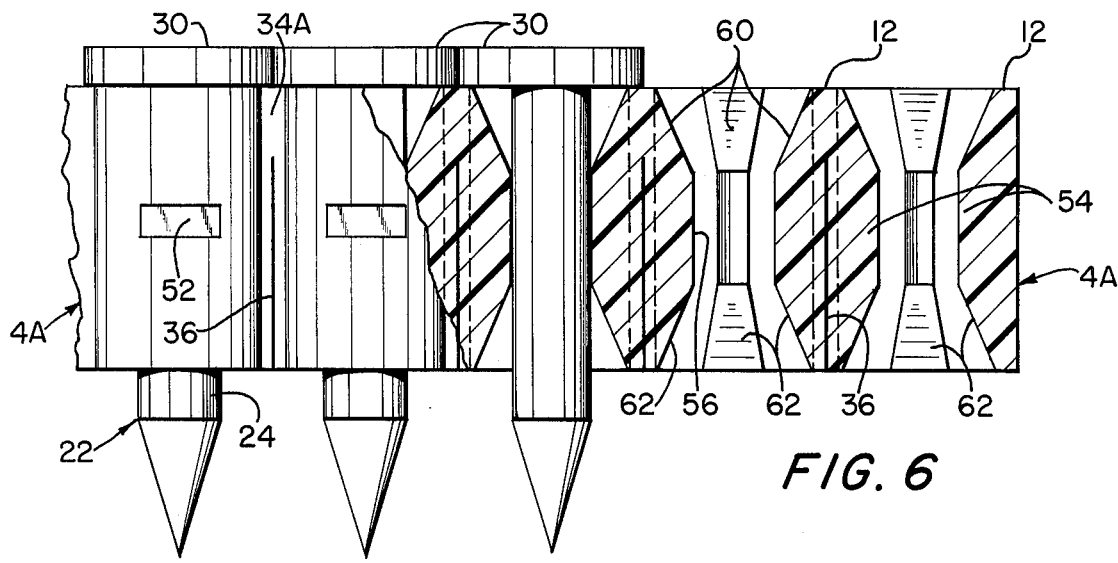
FIG. 6 is a view similar to FIG. 1 of a second form of nail supporting strip.

Unless otherwise stated, like numerals are used to refer to like parts in the several figures of the drawing. Also as used herein the term "nail" is intended to embrace threaded and unthreaded studs and also screws, as well as different types of nails such as common nails, finished nails, spikes, and T-nails.

Referring now to FIGS. 1-4, there is shown a nail clip which is designed to be loaded into a magazine of the type having a track or rail means for supporting the clip and guiding it forward toward the hammer guide bore of the impact tool under the influence of a spring-biased pusher associated with the magazine. Such magazine structure is conventional and is shown, for example, by U.S. Pat. No. 3711008. The nail clip comprises a nail supporting strip which consists of a plurality of identical sleeves 4 that are connected to one another so as to form an integral unit. The nail supporting strip may be made of metal but preferably the sleeves 4 are molded of a plastic or a plastic reinforced material. A low density polyethylene is preferred but, for example, polyethylene, nylon, Teflon ®, and polyurethanes also may be used. The strips may be made in any convenient length, e.g. each strip may consist of ten sleeves 4.

The outer surface 6 of each sleeve is cylindrical except that each sleeve is formed with two diametrically exposed flats 8 which extend parallel to the longitudinal axis of the strip. Additionally each sleeve has a flat right angle shoulder 10 at the bottom of each flat 8 and terminates in flat upper and lower end surfaces 12 and 14 respectively. The axial bores 16 of the sleeves may be round but preferably they are polygonal in crosssection. While bores 16 may be triangular in cross-section, a more preferred shape is a square as shown with the corners of the square formed by the flat inner surfaces 18 being bevelled as shown at 20 in FIG. 2. The distance between each pair of opposite inside surfaces 18 is smaller than the diameter of the shank 24 of the associated nail 22 by an amount which causes the nail to be gripped with a force which is sufficient to prevent it from falling out if the strip is turned upside down. In this embodiment of the invention, the upper and lower ends of bore 16 are formed with circular counterbores 26 and 27 which have the same diameter. Preferably, however, counterbore 27 has a greater depth than counterbore 26. The heads 30 of nails 22 are circular and preferably but not necessarily have a flat edge surface. The radius of curvature of the periphery of the nails is substantially the same as the radius of curvature of the outer surfaces 6 of sleeves 4, whereby the periphery of each nail head and the outer surface 6 of the associated sleeve correspond to axially separated portions of a cylinder. This assures proper guidance of the nail as it is being driven as hereinafter described.

The radius of curvature of the outer surface 6 of each sleeve is set so that if those outer surfaces were continued about the full periphery of each sleeve, the outer surface of each sleeve would be substantially tangent (i.e. tangent or nearly tangent) to the corresponding surface of each adjacent sleeve, in the manner represented by the broken line circular arcs 6A representing extensions of the profiles of surfaces 6. Instead, however, for ease of manufacture the surfaces 6 are cut back, preferably in the form of flats 32 on either side of the line of mutual tangency, thereby leaving a narrow web 34. Webs 34 may be coextensive with the full height of the sleeves as shown, or they may be cut back for short distances at either the top or bottom without materially impairing the performance of the nail clip when used in an impact driver tool. The web is made relatively thin but not so thin that the sleeves can be pulled apart using moderate manual force. Each web is characterized by a line fracture 36 which commences at the bottom end of the web and terminates short of the upper end of the web, so that a short section 34A of the web is intact. It is to be understood that the term line fracture means that web 34 is actually divided in two along that line, with substantially no gap between the two parts. Preferably the line fracture is a razor thin cut and is formed by severing the web with a cutting tool having a very thin and sharp cutting edge comparable to that of a conventional disposable shaving razor blade. The line fracture plane extends at substantially a right angle to the plane of the web (as shown in phantom at 36 in FIG. 1), so that the confronting edges of the two parts formed by the line fracture are flat, extend at a right angle to the plane of the flats 8, and mate fully with one another. The length of line fracture 36 is variable with consideration given to whether the webs are cextensive with the sleeves, but in any event it is set so that a predetermined amount of force is required to separate one sleeve from an adjacent sleeve by shearing the intact portion 34A of the web as hereinafter described. Preferably, but not necessarily, the line fracture extends for at least one-half of the web of the web. The length of the web is the vertical dimension of the web as viewed in FIG. 1.

Tha nails 22 are disposed so that preferably, but not necessarily, the heads 30 engage the upper end surfaces 12 of the sleeves as shown and the nails are long enough for their shanks to protrude from the lower ends of the sleeves as shown. If the heads of the nails are spaced from the upper ends of the sleeves, then preferably but not necessarily, bores 16 are sized so that the sleeves will grip the nails with a force which at least is equal to the amount of force required to be exerted on a nail by the hammer of the impact device in order to cause one sleeve to be sheared off from the adjacent sleeve as later described.

Figure 5:
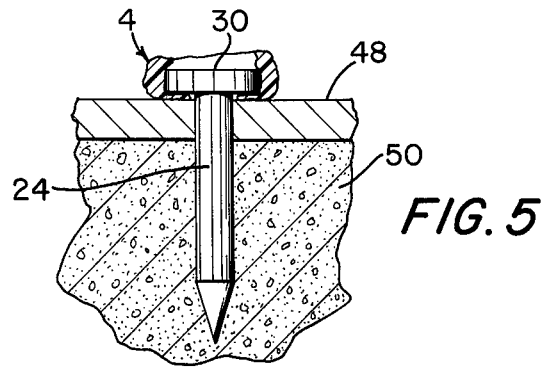
FIG. 5 illustrates how one of the sleeves of the strip of FIG. 1 is squashed when the associated nail is driven into a workpiece.

In use the nail clip is inserted into a magazine or holder associated with a power driven impact tool and is designed so that it can be slidably supported by the magazine. In this connection it is contemplated that the magazine (shown in phantom in FIG. 3) will have a pair of side walls or guides 40 and 42 which are separated from one another by an amount which is just enough to provide a loose sliding fit with respect to the nail heads 30 and the portions of sleeves 4 below flats 8. Additionally, the opposite sides of the magazine are provided with ribs or shoulders 44 that protrude far enough to engage and slidably support the lower end surfaces 14 of the nail supporting sleeves and additional ribs or shoulders 46 that overlie the shoulders 10 of the sleeves. The vertical spacing between ribs 44 and 46 is just enough to assure that the sleeves are free to slide lengthwise of the magazine but are restrained against relative vertical movement. It also is contemplated that the power driven impact tool has a round nail-receiving hammer guide bore with a diameter only slightly larger than the diameter of nail head 30, plus a side opening through which the leading sleeve and associated nail of the nail clip can be advanced into the hammer bore. Also when one sleeve with its associated nail is disposed in the hammer bore in position to be driven by the hammer, the next sleeve with its nail is positioned in the side opening of the tool and is restrained against vertical movement by the shoulders 44 and 46 of the magazine or corresponding restraining means forming part of the contour of the side opening. In the usual use the magazine will include a spring-biased pusher which indexes the nail clip forward to place a new sleeve 4 in the hammer guide bore following each complete nail-driving cycle of the hammer. When the hammer undergoes its nail driving stroke, it impacts the nail head 30 which lies in its path and drives it and the associated sleeve downward with sufficient force to shear the web portion 34A that is connected to the sleeve that is next in line. The web portion 34A is sheared in two along a line which is more or less a continuation of line fracture 36. As the severed sleeve and its associated nail are driven down by the hammer, the sleeve and the nail head cooperate with the surrounding wall of the hammer bore to keep the nail aligned with the hammer bore as it is driven into the workpiece. The severed sleeve has one-half of a web 34 extending along its length at two diametrically opposed points. These two web portions cooperate with the nail head 30 and the circularly curved surface 6 of the sleeve to prevent the nail from beccoming misaligned in the hammer bore. Thus, the nails cannot tilt in the hammer bore and thus will not jam. It also appears that jamming of the nail clip in the magazine is minimized by the fact that the flat confronting edges along the length of the line fracture 36 engage each other as the sleeves are advanced along the length of the magazine. Nail drivers with nail clips made as shoen in FIGS. 1–4 have been operated at the rate of 20 nails/minute for extended periods without jamming. In contrast prior nail clips having plastic nail-supporting strips have been unsatisfactory because of repeated jamming. A nail strip as shown in FIGS. 1–4 is particularly advantageous in avoiding jamming where the nails have a length in the order of two inches. For such nails satisfactory results are achieved using plastic sleeves of the type shown in FIGS, 1–4 with a height of approximately one-half inch. Providing the counter-bores 26 and 27 is advantageous in that it facilitates squashing of the sleeves 4 between the nails heads and the workpiece as the former is driven into the latter. Usually the squashed sleeve is captivated between the nail head and the workpiece. This result is shown in FIG. 5 where the squashed sleeve 4 is deformed around and under the head 30 of a nail that has been driven through a metal plate 48 into a concrete substrate 50. However, in some cases the squashed sleeve fractures and some or all of it is separated and is free of the nail head and the workpiece.

Figure 7:
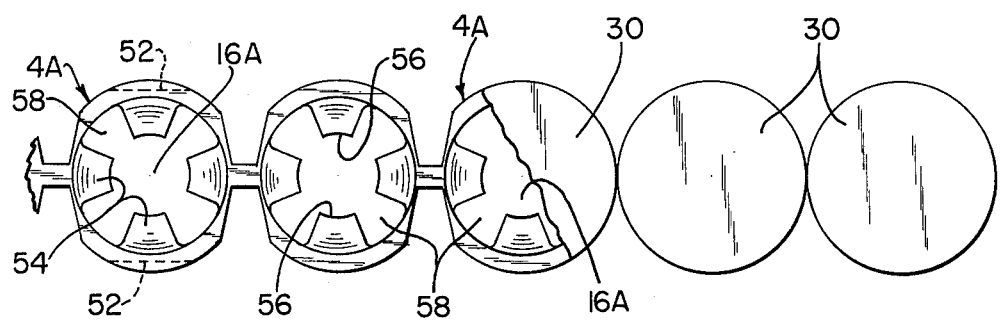
FIG. 7 is a plan view like FIG. 2 of the strip of FIG. 6.
Figure 8:
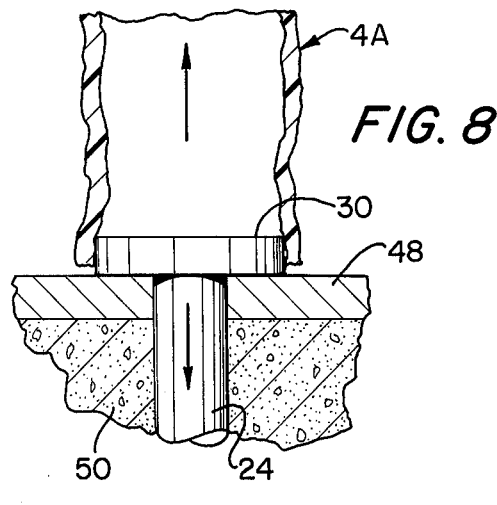
FIG. 8 illustrates how a sleeve of the strip of FIG. 6 is separated from the nail which it supports.

FIGS. 6 and 7 show a form of nail clip which is designed so that each nail will separate from its associated sleeve as it is driven into a workpiece. In this case the sleeves 4A are like the sleeves 4 of FIG. 1 except that (1) a flat-bottomed groove 52 is provided in place of each flat 8 and (2) the interior of each sleeve has a markedly different shape. More specifically each sleeve is formed with a bore 16A that is defined by a plurality of evenly spaced ribs 54 having like circularly curved inner surfaces 56 that are common to a circle that is concentric with the circle of curvature of outer surfaces 6. As a result the interior of each sleeve 4A is characterized by a plurality of evenly spaced longitudinally-extending grooves or channels 58. Additionally, the cross-sectional area of the interior of each sleeve is enlarged at its opposite ends. More specifically, each sleeve has a tapered counterbore at each end which is manifested by tapered end sections 60 and 62 at opposite ends of ribs 54. The diameter of the shank 24 of each nail 22 is sized so that the shank will be firmly gripped by the surfaces 56 of ribs 54. Additionally the counterbores are formed so that each of the end surfaces 12 are wide enough to provide support for the nail heads 30. Because of the grooves 58 and the sloping rib surfaces 60 and 62, each sleeve will become separated from the nail which it carries when the nail is driven into a workpiece. The action which occurs when a nail is driven is as follows: First the sleeve 4A surrounding the driven nail is sheared off from the next sleeve. Secondly the sheared off sleeves and nail are driven down along the hammer guide bore to the workpiece. Thirdly, the sheared off sleeve 4A is stopped by engagement with the workpiece while the nail 22 commences to penetrate the workpiece. Fourthly, as the hammer of the tool continues to apply a driving force to the nail, the nail head 30 expands the upper end of the sleeve and moves down along the surfaces 60. Fifthly, the driving force exerted by the hammer urges the nail head to travel down along the surfaces 60 and the sleeve reacts by expanding radially enough to allow the nail head to move down within the sleeve. Sixthly, as the nail begins to move down within the sleeve the driven tool recoils so that it backs off from the work even while the nail is still being propelled by the force of its hammer. Seventhly, as the nail continues to penetrate the workpiece, the nail head 30 moves completely through the sleeve and the latter separates from the nail as the nail head is driven tightly against the workpiece. FIG. 8 illustrates the latter stage of the above-described process, with the nail head 30 engaging a metal plate 48, the nail shank 24 penetrating a substrate 50, and the sleeve 4A being distorted as it is about to separate from the nail head. The separating action is indicated by the two arrows.

Figure 9:
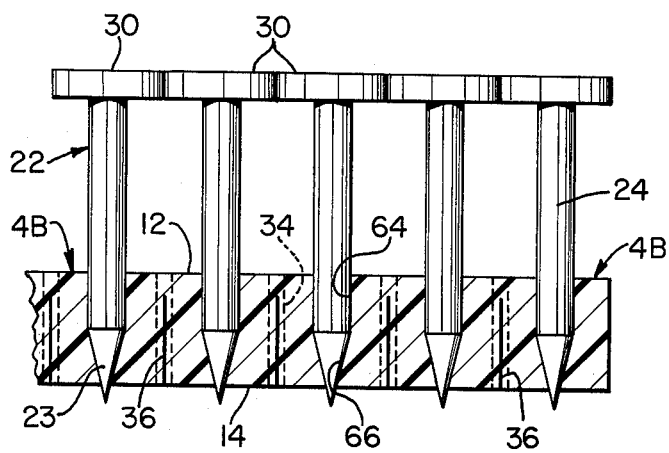
FIG. 9 is a view like FIG. 1 of a third form of nail clip.
Figure 11:
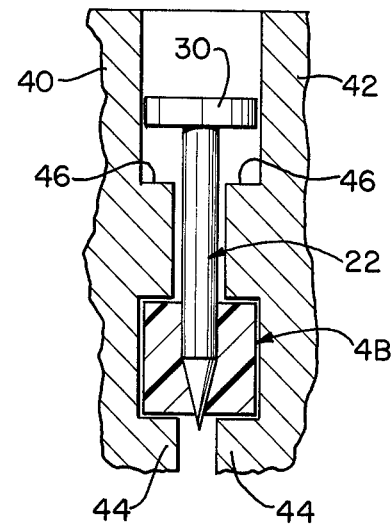
FIG. 11 is a cross-sectional view of the clip of FIG. 9 mounted in a magazine.
Figure 10:
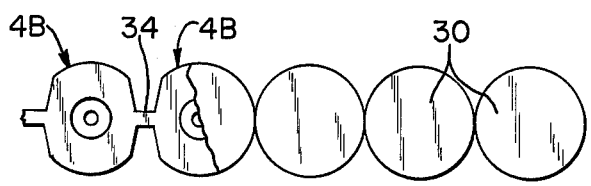
FIG. 10 is a view like FIG. 2 of the nail clip of FIG. 9.

In FIGS. 9 and 10 the nail strip comprises sleeves 4B which are like sleeves 4 of FIGS. 1-4 except that the bore forming their interiors comprises an upper constant diameter section 64 and a tapered or frusto-conical section 66. The nails 22 are disposed so that their tapered points 23 extend through and mate with the tapered hole sections 66, while a portion of the constant diameter section of the shank 24 fits in the bore section 64. Each nail makes a tight fit with the bore sections 64 and 66. Preferably the heads 30 have the same diameter as the outer surface of sleeves 4B as shown. However, the heads 30 may have a diameter smaller than that of the outer surface of the sleeves, depending upon the design of the magazine in which the strip is to be inserted. FIG. 11 illustrates how the nail clip of FIGS. 9 and 10 is supported in a magazine like the one shown in FIG. 3. The ribs 44 engage and support the sleeves 4B on their undersides, while the ribs 46 overlie the upper end surfaces of the sleeves and each nail head 30 makes a sliding fit between the sides 40 and 42.

Figure 12:
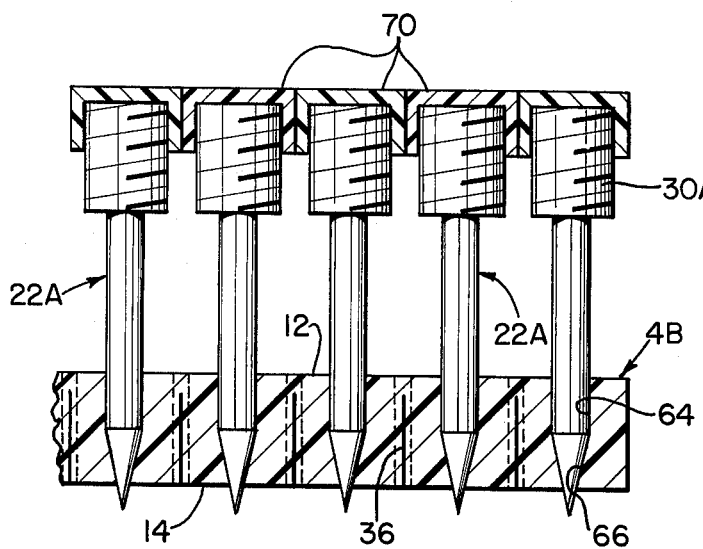
FIGS. 12 and 13 are views like FIGS. 9 and 11 of a fourth form of nail clip comprising threaded studs.
Figure 13:
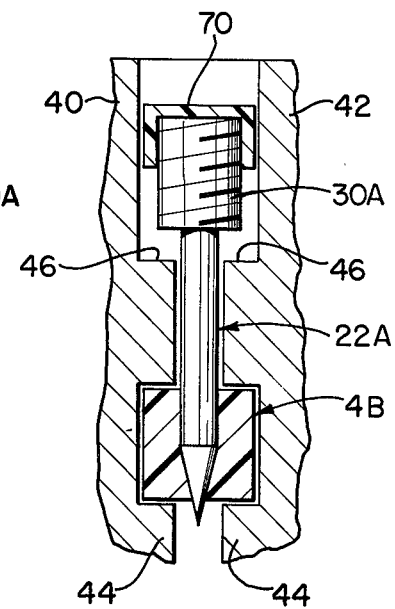

The embodiment of FIG. 12 is like that of FIG. 9 except that each of the fasteners is a stud which is formed with a threaded head section 30A and is provided with a plastic cap 70. The sleeves 4B are interconnected as above-described with respect to sleeves 4, but the caps 70 are not interconnected but lie close to one another. As shown in FIG. 13, the caps 70 are sized so as to make a close sliding fit between the sides 40 and 42 of the magazine. As an alternative measure, the caps 70 may have an outer diameter smaller than the diameter of the outer surfaces of sleeves 4B.

The invention herein described is characterized by two distinct features, that preferably are combined as in the illustrated embodiments but either of which may be employed without the other. One feature is the provision of the line fracture in the connecting webs 34. The other feature is designing the sleeve so that they would be mutually cotangent if it were not for the flats cutting them back as at 32 so as to form the connecting webs 34. This latter feature makes it possible to provide connecting ribs with a minimum distance between the centers of the sleeves, thereby reducing the amount of material consumed in making the nail supporting strip. The flats 8 also assist in reducing the amount of material consumed in making the nail-supporting strips.

Obviously the invention may take specific forms other than the ones herein illustrated and described. Thus, for example, the nail-supporting strip could be formed so that the sleeves are offset vertically one from another so as to fit in a magazine which is inclined in the manner of the magazine illustrated in U.S. Pat. No.

3086207. Also the nails could have heads and/or shanks which have non-circular peripheries. Thus, for example, the nail could be a T-nail (which is so-called because its head is generally rectangular in plan view), a nail having a peripheral flange on its shank, a nail having longitudinally extending grooves, or a nail with a shank that is square or rectangular in cross-section. Also the caps 70 may be omitted from the threaded heads of the studs shown in FIG. 12. Still other possible variations will be obvious to persons skilled in the art.

What is claimed is:

1. A nail support strip for supporting a plurality of nails in series with one another, said strip comprising a series of parallel sleeves each having a first end and a second opposite end, and a plurality of webs each connecting a pair of mutually adjacent sleeves and each having a corresponding first enc and a corresponding second end, said sleeves and said webs being integral with one another and made of the same material, and each web having a line fracture commencing at its first end thereof and extending toward but terminating short of said second end thereof, each web being divided by said fracture line into two parts having mutually confronting edge surfaces with substantially no gap between said edge surfaces, and the height of each web measured between said first and second ends thereof being substantially greater than the thickness of each web.

2. A nail support strip according to claim 1 made of a plastic material.

3. A strip according to claim 1 further including a pluraity of nails each extending within and gripped by one of said sleeves.

4. A strip according to claim 1 wherein each web has a fracture line which extends for at least one half of the height of the web.

5. A strip according to claim 1 wherein said sleeves are in a substantially straight row and each sleeve has a generally cylindrical outer configuration with a pair of diametrically opposed flat outer surfaces extending parallel to said row.

6. A strip according to claim 5 wherein said diametrically opposed flat outer surfaces extend through only a portion of the length of said sleeves and are arranged for guiding the strip in a magazine.

7. A strip according to claim 5 in combination with a plurality of nails, with each nail having a head in the form of a circular flange at one end and a pointed tip at the other end, and further wherein the diameter of each circular flange is larger than the distance between the opposed flat outer surfaces of said sleeves.

8. A strip according to claim 1 wherein each sleeve has a generally cylindrical outer configuration but is cut back where it would otherwise be mutually tangent with the next adjacent sleeve so as to form a web therebetween as required by claim 1.

9. A strip according to claim 1 wherein each sleeve as at least one internal surface defining a bore for receiving a nail, said bore comprising a first section of constant cross-sectional area and a second section of varying cross-sectional area.

10. A strip according to claim 9 wherein the cross-sectional area of said second section of said bore decreases in size with increasing distance from said first section of said bore.

11. A strip according to claim 9 wherein the cross-sectional area of said second section of said bore decreases in size with increasing distance from said first section of said bore so as to tightly accommodate the leading tip of said nail.

12. A strip according to claim 11 further including a plurality of nails each supported by one of said sleeves, each nail being disposed in one of said bores with the leading end of each nail being located in the second section of said bore and gripped by the surrounding sleeve.

13. A nail strip according to claim 12 further including a cap o the trailing end of each nail.

14. A nail strip according to claim 13 wherein the trailing end of each nail comprises a threaded head section.

15. A nail strip according to claim 13 wherein said caps have an outer diameter substantially the same as the outer diameter of said sleeves.

16. A strip according to claim 9 wherein said bore comprises a first center section of constant cross-sectional area, and second and third opposite end sections with cross-sectional areas that increase in size with increasing distance from said first center section.

17. A strip according to claim 16 wherein each sleeve is formed with a plurality of longitudinally extending, circumferentially spaced grooves and ribs along said first center section of said bore.

18. A nail strip according to claim 16 wherein each sleeve has at least two longitudinally extending, circumferentially-spaced ribs along the first center section of its bore.

19. A strip according to claim 1 comprising a pair of tracking grooves formed in each sleeve on opposite sides of the center axis of said strip, with the grooves in one sleeve being aligned with the corresponding grooves in the other sleeves.

20. A nail support strip according to claim 1 further including a plurality of nails each disposed within and supported by one of said sleeves, each nail having a flanged head at one end which overlies the top end of its supporting sleeve and a pointed tip at its other end which protrudes from the bottom end of its said supporting sleeve.

21. A nail support strip according to claim 20 wherein each sleeve has a maximum outer diameter substantially the same as the diameter of the flanged head of the nail which it supports.

22. A nail clip for use in supplying nails to a nail driver tool comprising:
a nail support strip in the form of a series of interconnected sleeves each having a top end and a bottom end;
a plurality of webs each extending between and connecting a pair of mutually adjacent sleeves, each web also having a top end and a bottom end; and
a plurality of nails each disposed within and supported by one of said sleeves;
each web having a line fracture extending vertically from its bottom end to a point short to its upper end.

23. A nail clip according to claim 22 wherein said nail support strip is made of plastic.

24. A one-piece nail support strip for supporting a plurality of nails in series with one another, said strip comprising a series of parallel sleeves, each sleeve having a generally cylindrical outer configuration, said sleeves being disposed so that the distance between their axes is at least twice their radius of curvature, each sleeve being cut back where it would otherwise be substantially mutually tangent with the next adjacent sleeve so as to form an integral web therebetween, and each web having a line fracture extending lengthwise thereof substantialy parallel to said sleeves.

25. A strip according to claim 13 made of a thermoplastic material.

26. A nail clip for use in supplying nails to a nail driver tool comprising a molded plastic nail support strip and a pluality of nails carried by said strip, said nails being of the type having a shank with a head at one end, said strip comprising (1) a series of identical sleeves of generally cylindrical shape disposed in single file with each sleeve surrounding and gripping only the shank of the nail which it carries and (2) a plurality of webs each extending between and connecting a pair of mutually adjacent sleeves, each of said webs being adapted to facilitate the severance thereof in response to a shearing force so that each sleeve can be severed from the strip by a shearing force produced by driving the nail carried by said each sleeve along the longitudinal axis of the slevve, each sleeve having at least one internal surface defining a bore for receiving a nail, said bore comprising a first section having a relatively small cross-sectional area and a second section contiguous with said first section having a cross-sectional area which increases in size with increasing distance from the first section and extends from said first section toward one end of the sleeve, each sleeve also being formed with a plurality of longitudinally extending, circumferentially spaced grooves and ribs along said first section of said bore and being adapted to spread apart and allow both the shank and head of the nail which it surrounds to pass through it under the influence of a nail-driving force when the sleeve is blocked by a workpiece against movement with the nail and the nail-driving force exceeds the minimum shearing force required to sever the sleeve from the strip.

27. A molded plastic strip according to claim 26 wherein said first section of said bore has a constant cross-sectional area, and further wherein said bore comprises a third section having a cross-sectional area which increases in size with increasing distance from the first section and extends from that first section toward the opposte end of the sleeve.

28. A molded plastic strip according to claim 26 wherein each nail has a head with a dimension in a plane extending radially of the longitudinal axis of its shank which is larger than said first bore section and does not exceed the outside dimension of the sleeve which supports it, and each shank extending lengthwise through a sleeve and being large enough in cross-section to be frictionally gripped by said sleeve along the length of said first bore section.

29. A molded plastic strip according to claim 28 wherein said head faces said second section of said bore.

* * * * *

UNITED STATES PATENT AND TRADEMARK OFFICE
CERTIFICATE OF CORRECTION

PATENT NO. : 4106618

DATED : August 15, 1978

INVENTOR(S) : Harry M. Haytayan

It is certified that error appears in the above-identified patent and that said Letters Patent are hereby corrected as shown below:

Claim 1, column 7, line 17, "enc" should be -- end --.

Claim 9, column 7, line 57, "as" should be -- has --.

Claim 13, column 8, line 10, "o" should be -- on --.

Claim 22, column 8, line 57, "to" (second occurrence) should be -- of --.

Claim 26, column 9, line 20, "slevve" should be -- sleeve --.

Signed and Sealed this

Twenty-seventh Day of February 1979

[SEAL]

Attest:

RUTH C. MASON
Attesting Officer

DONALD W. BANNER
Commissioner of Patents and Trademarks